United States Patent [19]

Gluschke et al.

[11] Patent Number: 5,740,215
[45] Date of Patent: Apr. 14, 1998

[54] SYSTEM FOR BACKCOOLING RADIOACTIVE-WASTE CONTAINERS

[75] Inventors: Konrad Gluschke, Wickede; Horst-D. Ekrut, Sprockhövel, both of Germany

[73] Assignee: GNB Gesellschaft fur Nuklear-Behalter mbH, Essen, Germany

[21] Appl. No.: 805,407

[22] Filed: Feb. 24, 1997

[30] Foreign Application Priority Data

Jan. 17, 1997 [DE] Germany ............ 197 01 549.2

[51] Int. Cl.$^6$ ............ G21C 19/08; G21F 5/10
[52] U.S. Cl. ............ 376/272; 376/298
[58] Field of Search ............ 376/272, 298, 376/299; 250/506.1, 507.1

[56] References Cited

U.S. PATENT DOCUMENTS

| | | |
|---|---|---|
| 4,626,414 | 12/1986 | Baatz et al. ............ 376/272 |
| 4,894,550 | 1/1990 | Baatz et al. ............ 376/272 |
| 4,987,313 | 1/1991 | Baatz et al. ............ 376/272 |
| 5,475,721 | 12/1995 | Baatz et al. ............ 376/272 |

*Primary Examiner*—Daniel D. Wasil
*Attorney, Agent, or Firm*—Herbert Dubno; Andrew Wilford

[57] ABSTRACT

A transport/storage container holding spent radioactive fuel elements is cooled by withdrawing gases from inside the container to create a subatmospheric pressure therein, feeding coolant water from a reservoir into the container, withdrawing steam from the container, and condensing the steam outside the container into condensate water. A common pump is used both to withdraw gases and steam from the container. The steam is condensed by contacting it with water drawn from the reservoir. In addition the water drawn from the reservoir is passed countercurrent to the steam in a condenser and the condensate water is fed back to the reservoir.

6 Claims, 3 Drawing Sheets

SYSTEM FOR BACKCOOLING RADIOACTIVE-WASTE CONTAINERS

FIELD OF THE INVENTION

The present invention relates to the handling and treatment of containers of radioactive waste. More particularly this invention concerns the backcooling of such containers.

BACKGROUND OF THE INVENTION

The containers used to hold radioactive waste, normally spent fuel elements, typically get fairly hot. It is essential to cool them, a procedure called backcooling, substantially before they can be handled. Such containers are described in commonly owned patents 4,894,550 and 5,475,721.

The standard method of cooling such containers is simply to circulate cold water through. In order to accelerate the cooling, the entire container is immersed in the fuel-element water reservoir. Gases, typically steam, build up in such a container being backcooled and are conducted away, still leaving the interior of the container under a superatmospheric pressure and subjecting the various feed lines for the cooling water to this pressure. As a result these cooling installations are fairly complex and expensive.

In addition the known methods are relatively inefficient. The main reason for this is that the heat extracted by the coolant water is first transmitted to the walls of the container which are cooled in their turn, slowing the overall backcooling operation. Thus it takes quite some time to extract this heat from the container, while at the same time feeding more cooling water into the pressurized container by means of an appropriate lance. Trapping and carrying off the vapors and hot liquid coming out of the container, all under pressure, is another problem requiring expensive equipment.

OBJECTS OF THE INVENTION

It is therefore an object of the present invention to provide an improved method of backcooling containers of radioactive waste.

Another object is the provision of such an improved method of backcooling containers of radioactive waste which overcomes the above-given disadvantages, that is which operates quickly and efficiently and with relatively inexpensive equipment.

SUMMARY OF THE INVENTION

A transport/storage container holding spent radioactive fuel elements is cooled has according to the invention by withdrawing gases from inside the container to create a subatmospheric pressure therein, feeding coolant water from a reservoir into the container, withdrawing steam from the container, and condensing the steam outside the container into condensate water.

According to the invention a common pump as described in commonly owned patent 4,626,414 is used both to withdraw gases and steam from the container, creating a subatmospheric pressure in the container before any coolant water is introduced into it and maintaining this subatmospheric pressure during the entire cooling process. The reservoir is the normally provided reservoir in which the fuel rods sit, this water being introduced into the container at about 40° C. This water is normally also degassed. Of course it is possible with this invention to backcool a plurality of such containers simultaneously.

The steam is condensed by contacting it with water drawn from the reservoir. More specifically, the water drawn from the reservoir is passed as a spray countercurrent to the steam rising in a condenser and the condensate water is fed back to the reservoir.

The invention is based on the recognition that a fuel-element holding container can be cooled very quickly when the container is maintained at a subatmospheric pressure and any steam generated is immediately withdrawn from the container. The result is extremely fast heat exchange since the carried-off steam takes with it much of the heat from the fuel elements. The container is cooled from the bottom up, as the coolant water collects in the container and slowly fills it. There is no need to immerse the container in a coolant bath to accelerate the process, so it can be carried out at virtually any site. In about 10 hours it is possible to reduce the container to at most 60° C., after which no further cooling is normally needed.

The equipment needs of the inventive process are minimal. The pump normally used to dry the container's interior can be used for creating and maintaining the subatmospheric pressure in the container during the backcooling operation. Thus the system of this invention can easily be retrofitted to an existing container-filling system. The volume/time rate of water passed through the container largely determines the cooling time as well as the level of the subatmospheric pressure.

BRIEF DESCRIPTION OF THE DRAWING

The above and other objects will become apparent from the following, reference being made to the accompanying drawing in which.

SPECIFIC DESCRIPTION

Figure 1:
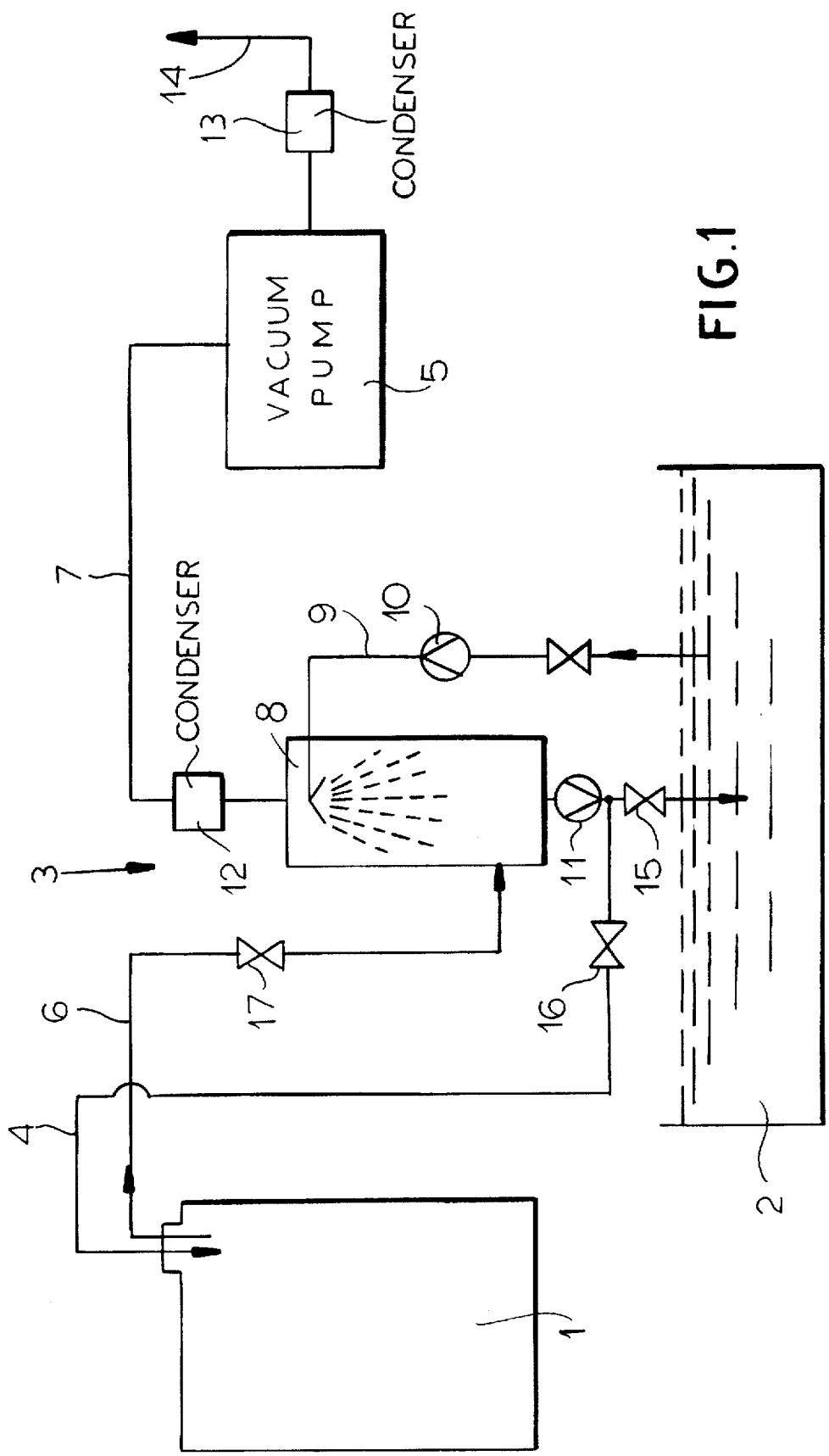
FIG. 1 is a mainly schematic diagram illustrating the method of this invention.

As seen in FIG. 1 a standard container 1 for spent radioactive fuel rods is connected to an input feed lance or conduit 4 and an output line or conduit 6, the latter opening in the container 1 somewhat above the former. A standard fuel-rod holding tank 2 full of water serves as the supply of cold water, normally less than 60° C., for the system. According to the invention these elements are connected by a system 3 that is also connected to the standard evacuating pump 5.

More specifically the conduit 4 is connected via a valve 16 and a pump 11 to the lower end of a condense/scrubber 8 receiving water from the tank 2 via a valve 18, pump 10, and line 9. A valve 15 allows some of the output of the pump 11 to be fed back to the reservoir 2. The line 6 is connected via a valve 17 to the lower region of the condenser 8. The upper end of the condenser 8 is connected via a recondenser 12 and a line 7 to the vacuum pump 5 whose output is connected through another condenser 13 to an output vent line 14.

The system works as follows:

The pump 5 first evacuates the line 7, condenser 8, line 6, and container 1, creating in this interconnected system a substantial subatmospheric pressure that largely eliminates any possibility of leakage to the surroundings. The pumps 10 and 11 are started with the valves 16, 17, and 18 wide open and the valve 15 cracked. This pumps water out of the supply tank 2 and sprays it into the top of the condenser 8. From the bottom of the condenser 8 the pump 11 passes most of the water through the line 4 to the container 1 where to start with most of the water is vaporized into steam. This steam passes via the line 6 to the condenser 8 where it is condensed and, as described above, mainly recirculated via the line 4 to the container 1 and partially returned to the tank 2.

The result is an extremely rapid cooling of the tank 1 since the vapor generated is drawn off and replaced by liquid water, whose much higher heat capacity cools the container 1 and rods therein very rapidly.

EXAMPLE

The system of FIG. 1 is used with a container filled with spent fuel elements and having a decay rate of 21 kW. Cold water at 40° C. is pumped at a rate of 20l/min into the container at an ambient temperature at 27° C. The free volume of the container 1, that is the portion not occupied by the spent fuel rods, is 4.4 $m^3$ and the exposed surface inside the container is about 1.32 $m^2$.

Figure 2:
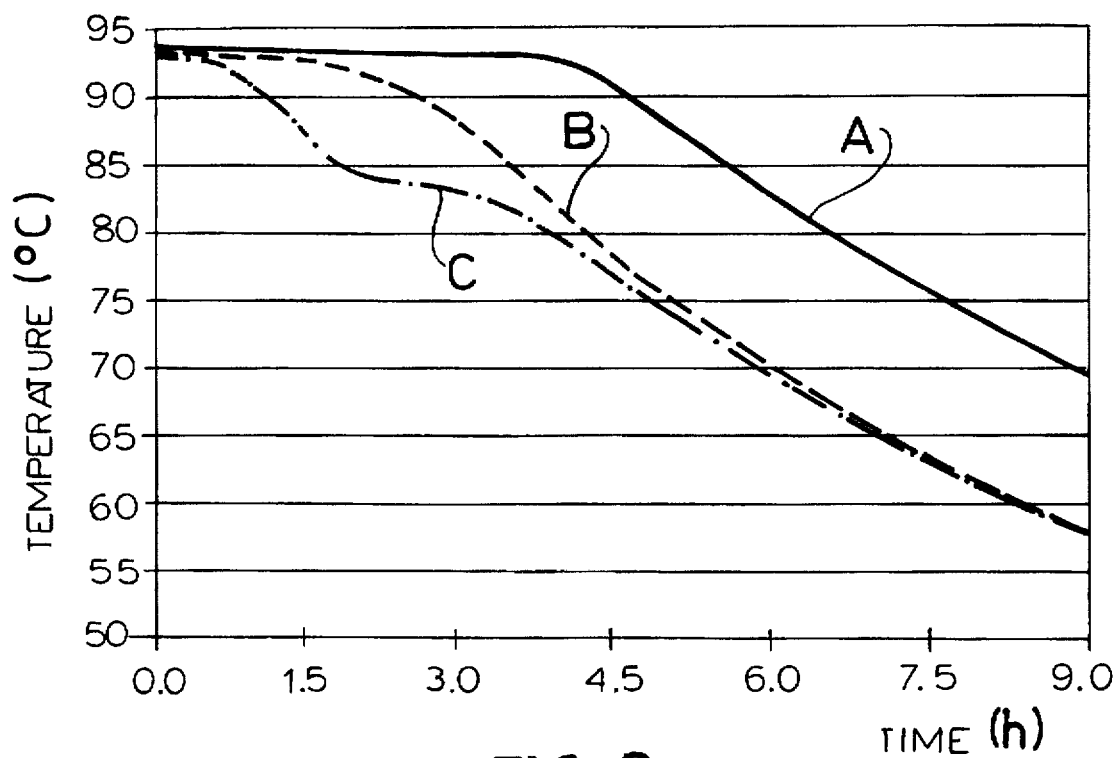
FIGS. 2 through 5 are graphs illustrating various aspects of the method of this invention.

FIG. 2 shows the temperature curve over about 9 hours. Curve A shows the temperature at the cover of the container 1, curve B the temperature for the side wall of the container 1, and curve C the temperature at the floor of the container 1. Thus within less than 10 hours the temperature is reduced from near the boiling point of water to about 60° C.

Figure 3:
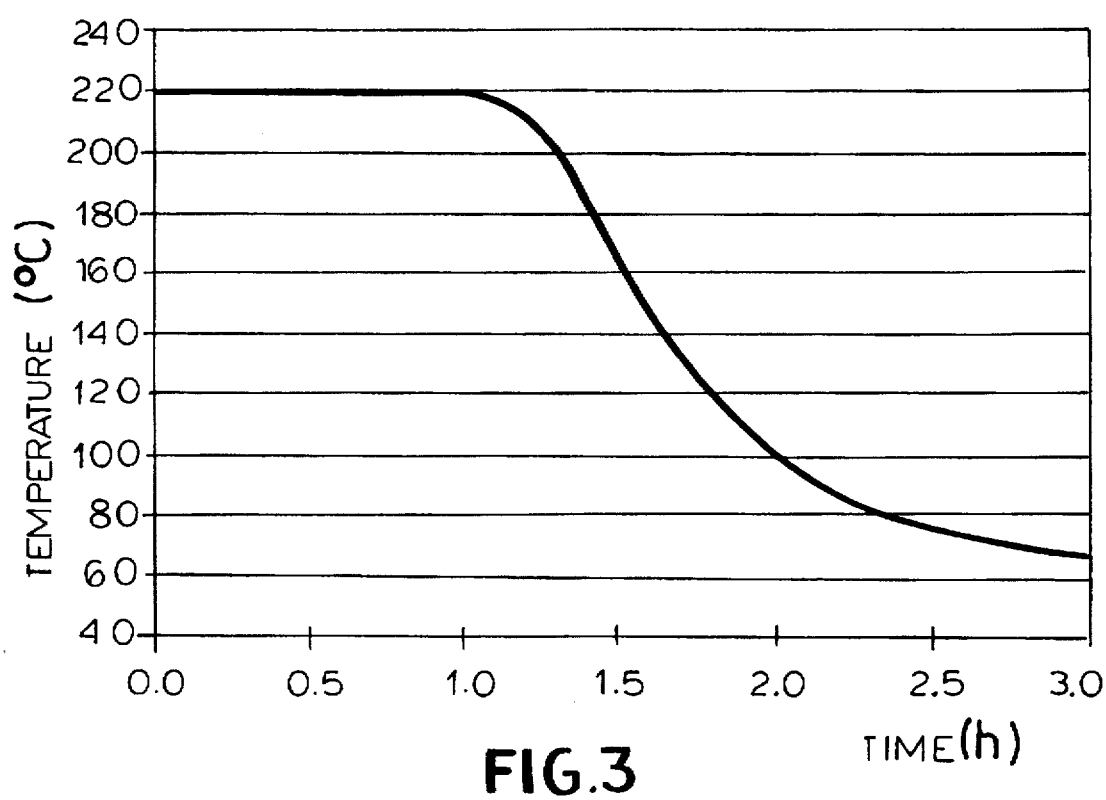

FIG. 3 shows the temperature of the fuel elements during the first 3 hours of the backcooling operation.

Figure 4:
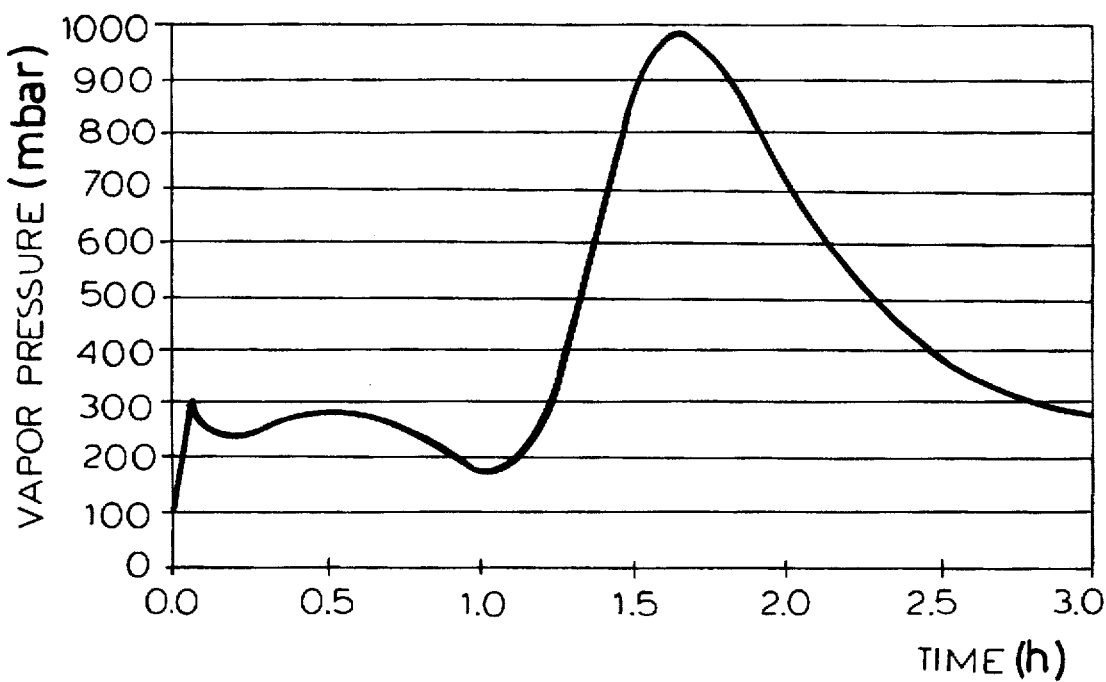

FIG. 4 represents the vapor pressure in the container during the first 3 hours of the backcooling operation. Thus the pressure in the container 1 is always below 1 bar, that is in a subatmospheric range. At its greatest, the vapor pressure in the container is slightly below atmospheric pressure and at this time the line 6 is almost closed.

Figure 5:
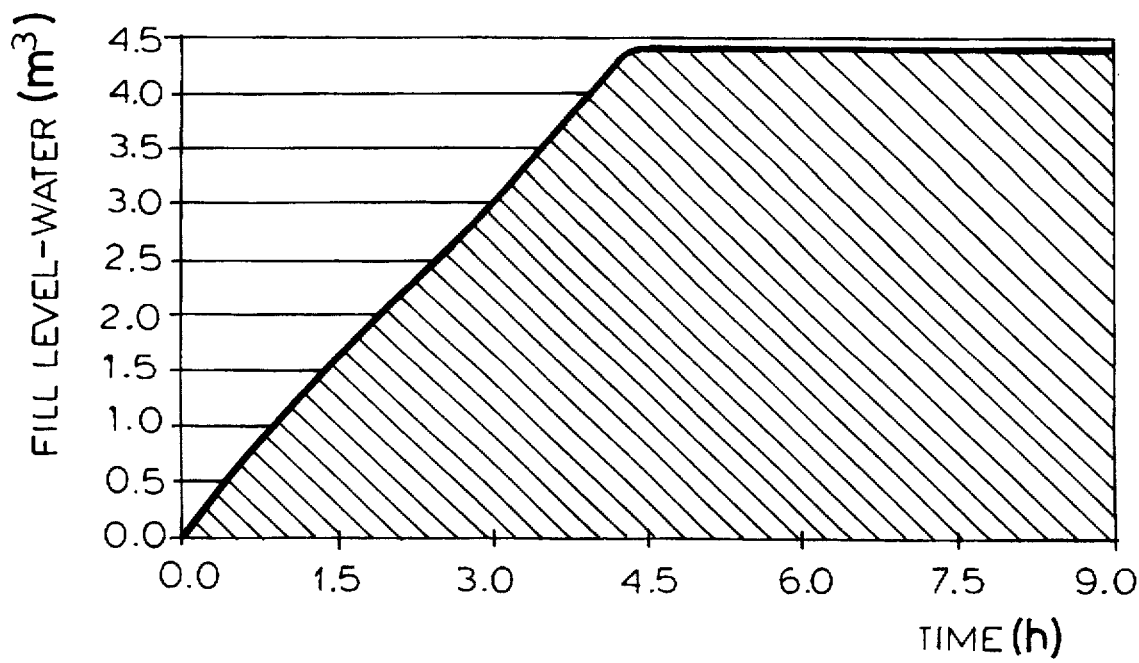

FIG. 5 shows how much liquid water is in the container over the 9 hours of the backcooling operation. It takes about 4 hours before the container 1 and its contents are cool enough that no more water is vaporized by the hot fuel elements.

We claim:

1. A method of backcooling a transport/storage container holding spent radioactive fuel elements, the method comprising the steps of:

a) withdrawing gases from inside the container to create a subatmospheric pressure therein;

b) feeding coolant water from a reservoir into the container;

c) withdrawing steam from the container; and d) condensing the steam outside the container into condensate water.

2. The backcooling method defined in claim 1 wherein a common pump is used both to withdraw gases in step a) and to withdraw steam in step c).

3. The backcooling method defined in claim 1 wherein the steam is condensed by contacting it with water drawn from the reservoir.

4. The backcooling method defined in claim 3 wherein the water drawn from the reservoir is passed countercurrent to the steam in a condenser.

5. The backcooling method defined in claim 1, further comprising the step of:

e) feeding the condensate water back to the reservoir.

6. The backcooling method defined in claim 1 wherein steps a) and c) are done continuously.

* * * * *